United States Patent
Lee et al.

(10) Patent No.: US 9,016,915 B2
(45) Date of Patent: Apr. 28, 2015

(54) LIGHT TUBE

(75) Inventors: Shi-Wei Lee, Kowloon (HK); Shuk Fan Siu, Kwai Chung (HK); Wing Shan Kwong, Kowloon (HK); Wai Fong Lai, Tseung Kwan O (HK); Wai Lam Cheng, Yuen Long (HK); Kin Ho Poon, Tai Koo (HK); Rong Zhang, Kowloon (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 488 days.

(21) Appl. No.: 12/683,814

(22) Filed: Jan. 7, 2010

(65) Prior Publication Data

US 2010/0302770 A1 Dec. 2, 2010

Related U.S. Application Data

(60) Provisional application No. 61/213,304, filed on May 28, 2009.

(51) Int. Cl.
| | | |
|---|---|---|
| *F21V 7/04* | (2006.01) | |
| *F21V 29/00* | (2006.01) | |
| *F21K 99/00* | (2010.01) | |
| *F21S 8/10* | (2006.01) | |
| *F21V 8/00* | (2006.01) | |
| *F21Y 101/02* | (2006.01) | |

(52) U.S. Cl.
CPC .............. *F21V 29/004* (2013.01); *F21K 9/00* (2013.01); *F21S 48/328* (2013.01); *F21V 29/246* (2013.01); *F21Y 2101/02* (2013.01); *G02B 6/001* (2013.01)

(58) Field of Classification Search
USPC ................. 362/555, 218, 219, 217.1, 217.11, 362/249.01, 249.02
See application file for complete search history.

(56) References Cited

U.S. PATENT DOCUMENTS

| | | | |
|---|---|---|---|
| 6,609,813 B1 | 8/2003 | Showers et al. | |
| 7,507,001 B2 * | 3/2009 | Kit | 362/276 |
| 2002/0131275 A1 * | 9/2002 | Yamamoto et al. | 362/555 |
| 2004/0246719 A1 * | 12/2004 | Shen | 362/249 |
| 2005/0117351 A1 | 6/2005 | Kuisma | |
| 2005/0122742 A1 * | 6/2005 | Ho | 362/615 |
| 2007/0228999 A1 * | 10/2007 | Kit | 315/291 |

(Continued)

FOREIGN PATENT DOCUMENTS

| | | |
|---|---|---|
| JP | 2008-84801 | 4/2008 |
| JP | 2008-258124 | 10/2008 |

(Continued)

OTHER PUBLICATIONS http://www.merriam-webster.com/dictionary/segment; Apr. 22, 2009.*

*Primary Examiner* — William Carter
(74) *Attorney, Agent, or Firm* — Amin, Turocy & Watson, LLP

(57) ABSTRACT

A light tube for producing light, which may be used in the light fittings, desk lamps, vehicle lights etc. The light tube comprises a plurality of segments arranged end to end along the end of the light tube. Each segment has a transparent or translucent rod 706 having two ends, a head spreader 703 by at least one of said ends and an LED 705 mounted to each heat spreader 703 for directing light laterally into the rod 706. The heat spreaders 703 are mounted to a metal jacket 702 for dissipating heat. The light tube further comprises one or more reflectors 708, 711 for reflecting light out of the light tube.

22 Claims, 5 Drawing Sheets

(56) References Cited

U.S. PATENT DOCUMENTS

| | | | |
|---|---|---|---|
| 2008/0013316 A1* | 1/2008 | Chiang | 362/264 |
| 2008/0112183 A1 | 5/2008 | Negley | |
| 2008/0294153 A1* | 11/2008 | Altshuler et al. | 606/9 |
| 2009/0009994 A1* | 1/2009 | Wu et al. | 362/230 |
| 2009/0290334 A1* | 11/2009 | Ivey et al. | 362/219 |

FOREIGN PATENT DOCUMENTS

| | | |
|---|---|---|
| WO | 2005052443 A1 | 6/2005 |
| WO | WO 2006/086927 A1 | 8/2006 |
| WO | 2008078077 A1 | 7/2008 |
| WO | WO 2009/004739 A1 | 1/2009 |

\* cited by examiner

LIGHT TUBE

RELATED APPLICATIONS

The present invention claims priority from U.S. Provisional Patent Application No. 61/213,304, filed 28 May 2009.

TECHNICAL FIELD

The present invention relates to a light tube for producing light. Such light tubes may, for example, be used in light fittings, desk lamps, vehicle lights etc. It is to be understood that in this specification the term 'light tube' is not limited to tubes of circular cross section, but encompasses all types and shapes of light tube.

BACKGROUND OF THE INVENTION

LEDs have many advantages such as long life, low power consumption, and high efficiency. In recent times LED-based luminous products have become more and more popular. LED tubes are especially attractive for general illumination due to the above-mentioned advantages. Indeed, LED tubes are a promising potential replacement for traditional fluorescent light tubes. However, there are two major problems which need to be solved. One is their optical performance. Currently, LED arrays are mounted in a tube for generating light. Due to the concentrated light emission of LED chips, the light distribution of an LED tube is not as uniform and comfortable as that of conventional fluorescent tubes. The light from a conventional LED tube can have a "spotty effect" due to the uneven distribution of light throughout the tube. Another problem is thermal management. The heat generated by LED chips needs to be dissipated effectively in order to guarantee the optical performance and the operation life of LED tubes.

FIG. 1 is a schematic drawing showing a prior art commercial LED light tube. The light tube 1 comprises a PCB strip 10 on which LEDs 20 are mounted and which is inserted into a transparent plastic cylinder 30. The cylinder or "shell" 30 is then sealed with end caps 40. Electric power and a ground line are distributed through the electrode pins 45 on the end caps 40. In this typical structure, the LEDs 20 are facing towards the front side 30a of the tube 39, emitting light directly to outside the tube. Since the light emitted from LEDs 20 has a relatively small angle, the distribution of the light is rather non-uniform. This gives rise to a "spotty effect". The surface of the shell 30 may be roughened or a diffuser may be added to scatter the light. However, such arrangements will substantially reduce the optical output. Furthermore, there is limited thermal management that can be done in the existing commercial LED light tubes due to the simplicity of mechanical structure.

SUMMARY OF THE INVENTION

In general terms the present invention proposes a light tube comprising a plurality of point light sources (e.g. LEDs) in which the point light sources are placed in thermal communication with a metal member for dissipating heat; and/or in which the point light sources are arranged to direct light laterally into a plurality of light guides and the light guides are arranged to reflect the light out of the light tube. In this way heat may be effectively dispersed and a smooth non-spotty distribution of light can be achieved.

A first aspect of the present invention provides a light tube comprising a plurality of segments arranged end to end along the length of the light tube; each segment comprising transparent or translucent rod having two ends, a heat spreader at each end of the rod and one or more LEDs mounted to each heat spreader for directing light into the rod; the heat spreaders being mounted to a metal member for dissipating heat; the light tube further comprising one or more reflectors for reflecting light out of the light tube. Preferably each rod has an LED at each of its ends. Each rod may have more than one LED at each end.

As the segments are arranged end to end and each segment has at least one LED at either end, the LEDs are distributed throughout the tube. Further, as the light is directed laterally into the rods and then reflected outward, the output light is relatively uniform. This is in contrast to the situation shown in FIG. 1 where the LEDs face the front side of the tube and project light directly out of the tube.

The rods act as light guides and may be made of any suitable material, for example plastic, glass or acrylic. The reflectors are preferably reflective coatings of the rods. Alternatively, or in addition, the light tube may have reflectors external to the rods.

Preferably the metal member is a metal jacket and the heat spreaders in the different segments are all mounted to the same metal jacket. The metal jacket may provide structural support for the light tube.

Preferably the segments are arranged periodically along the length of the light tube and preferably are of the same length. This further enhances the uniform nature of the output light.

A second aspect of the present invention provides a light tube comprising a plurality of light guides and a plurality of point light sources (e.g. LEDs), each said point light source being associated with a respective light guide and arranged for directing light into said respective light guide. The point light sources are in thermal communication with a metal member for dissipating heat. As the point light sources are in thermal communication with the metal member, heat generated by the point light sources may be communicated to (e.g. through conduction) to the metal member and then dissipated (e.g. into the atmosphere or a heat sink from the metal member surface). Preferably at least two of the point light sources are mounted (directly or indirectly) to the same metal member; more preferably all of the point light sources are mounted to the same metal member.

Preferably each light guide as two ends and at least one point light source is mounted to each end of the light guide (for injecting light into the light guide). The light guides may be any suitable length. Lengths of 40 mm to 100 mm were tested, but other lengths could be used instead. The light guides may have substantially the same length in order to further smooth the distribution of light.

Preferably each point light source is mounted to a heat spreader and each heat spreader is mounted to a metal member for dissipating heat. Preferably the heat spreader has a higher thermal conductivity than the thermal conductivity of the metal member. For example, the heat spreader may be made copper, while the metal member may be made of aluminum. This facilitates rapid transfer of heat from the point light source to the metal member. Generally the metal member has a much larger surface area than the heat spreader; the rate of heat transfer is the same in both materials, but the density of heat transfer higher in the heat spreader. This facilitates transfer of heat from the small surface area of the discrete point light source to the larger surface area on the metal member from where it can be dissipated to the air or otherwise.

Preferably all of the heat spreaders are mounted to the same metal member. The metal member may be a metal jacket. Preferably the metal jacket is approximately semi-circular in cross section. It may provide structural support for the whole light tube. Preferably each light guide has a heat spreader and associated LED at each end.

Each heat spreader has two opposite sides and preferably at least one point light source (e.g. LED) is mounted to each side. The point light source may be mounted to the heat spreader by via a substrate.

Preferably there is a plurality of light guides along the length of the light tube and a heat spreader is provided between each light guide. The light guides are preferably mounted in a transparent or translucent casing (e.g. glass or plastic). The casing may have one or more end caps and electrical connections for conveying electricity to the discrete point light sources.

Each light guide preferably has a reflector for reflecting light out of the light tube. The reflector is preferably a reflective coating of the light guide. For example, one side of the light guide may have a reflective coating such that light is reflected out of the opposite (non-coated) side. Additionally, or alternatively, a reflector external to the light guide may be provided. The external reflector may, for example, be an inner surface of the metal jacket.

The light guides may, for example, be translucent or transparent rods; preferably plastic, acrylic or glass rods. The light guides may have any cross sectional shape; for example: circular, rectangular, square, diamond, crescent or semi-circle.

The light tube may contain two or more parallel rows of light guides. At least one, and preferably both, end(s) of each light guide has a recess for accommodating a point light source such as an LED.

The point light sources may be arranged at one or both ends of each light guide. The light guides are preferably arranged periodically along the length of the light tube so as to form a plurality of segments of the light tube. They preferably have substantially the same length so as make the output light even more uniform by uniform distribution of the light sources along the length of the light tube.

A third aspect of the present invention provides a light tube comprising at least first and second light guides arranged end to end along a length of the light tube; the first light guide having a first end and a second end; the second light guide having a first end and a second end; the second end of the first light guide facing the first end of the second light guide; a first point light source at a first end of the first light guide; a second point light source between the second end of the first light guide and the first end of the second light guide and a third point light source at the second end of the second light guide.

The first point light source directs light into the first light guide; the second point light source directs light into the first and/or second light guides and the third point light source directs light into the second light guide. In this way light is distributed evenly as there is a light source in between the first and second light guides and at their remote ends.

Preferably the light tube comprises three or more light guides arranged end to end, each light guide having two ends and point light sources being provided at each end of each said light guide. There may be four or more light guides arranged end to end. Preferably the light guides have the same length as each other.

Preferably the light guides have a recess at their ends for accommodating a point light sources, such as an LED.

A fourth aspect of the present invention provides a lamp or other illumination apparatus comprising the light tube of any one of the first to third aspects of the present invention.

Features of any of the above aspects of the invention may be combined together.

BRIEF DESCRIPTION OF THE DRAWINGS

Preferred embodiments of the present invention will now be described, by way of example only, with reference to the appended drawings, in which:—

FIG. 2(a) is a schematic drawing showing a longitudinal cross-section of a light tube according to a first embodiment of the present invention;

FIG. 2(c) is a more detailed longitudinal cross-section of a light tube according to an embodiment of the present invention similar.

DETAILED DESCRIPTION OF PREFERRED EMBODIMENTS

Figure 1:
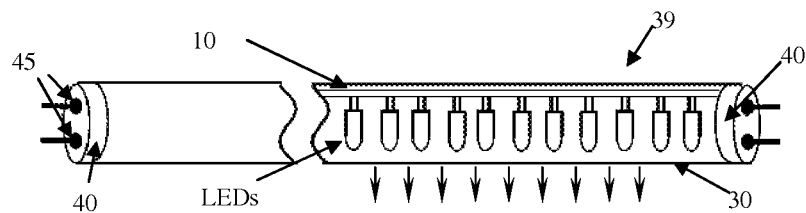
FIG. 1 is a schematic drawing showing a conventional LED light tube.

References are now made to the drawings, in which the same reference numerals are used throughout the different drawings to designate the same or similar components.

Figure 2:
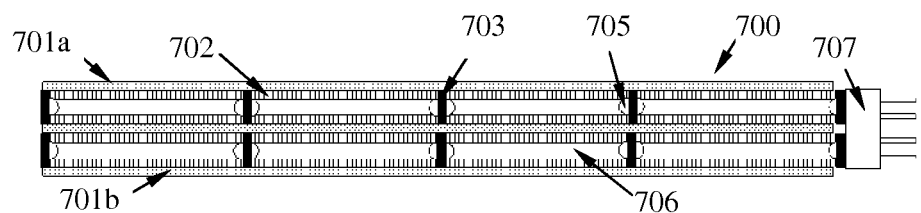
Figure 2B:
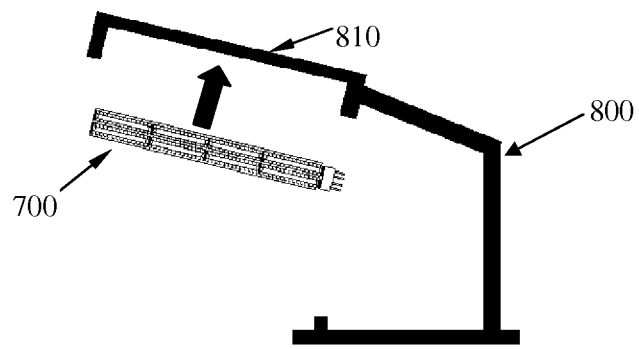
FIG. 2(b) is a schematic drawing showing a desk lamp having a light tube according to an embodiment of the present invention.

FIG. 2 is a schematic drawing of a light tube 700 according to a first embodiment of the present invention. The light tube comprises two casing tubes or "shells" 701a and 701b, which are fixed together side by side. The casings are transparent or translucent and may, for example, be made of glass or plastic. The light tube 700 further comprises a plurality of light guides in the form of transparent or translucent rods 706 which are fitted inside the casing 701. The rods may, for example, be made of plastic, acrylic or glass.

The light guides 706 are arranged end to end along the length of the light tube and form segments of the light tube. Each light guide 706 has two opposite ends and a discrete point light source 705 (e.g. an LED) mounted to or accommodated at each end. An end cap 707 at one end of the light tube provides electrical connections for supplying power to the point light sources.

As can be seen in FIG. 2 (a) and FIG. 2 (c) the LEDs 705 are installed facing along the center line of the tube, rather than facing outward directly as in FIG. 1. The LEDs 705 are thus arranged to direct light laterally into their associated light guides 706 with the injected light having a main component parallel to the length of the light tube. One or more reflectors are arranged to reflect light out of the sides of the light guide in a direction with a component perpendicular to the length of the light tube.

Figure 2C:
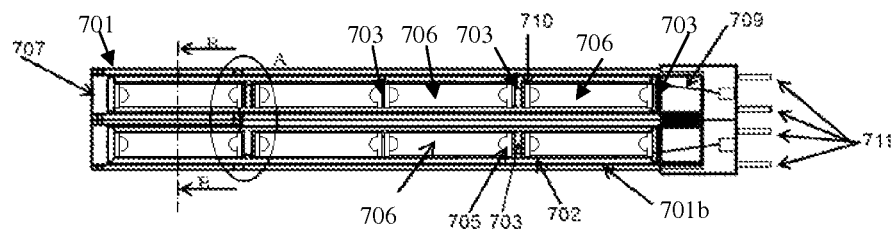
Figure 2D:
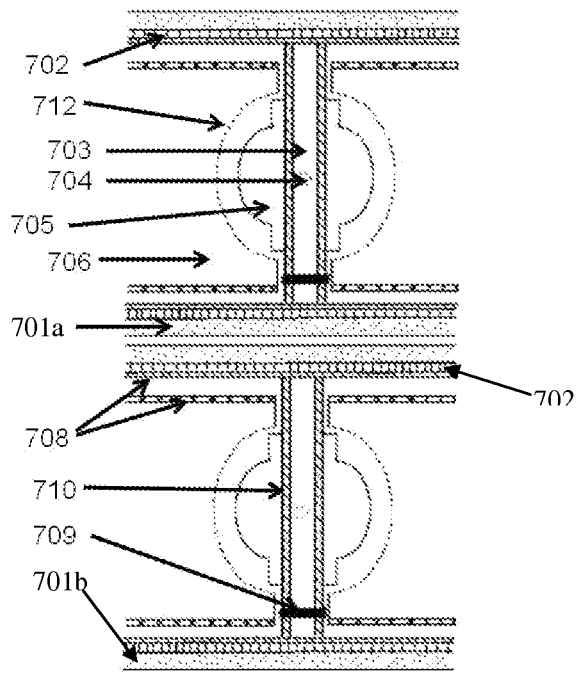
FIG. 2(d) is a close-up top view of Region A denoted in FIG. 2(c)
Figure 2E:
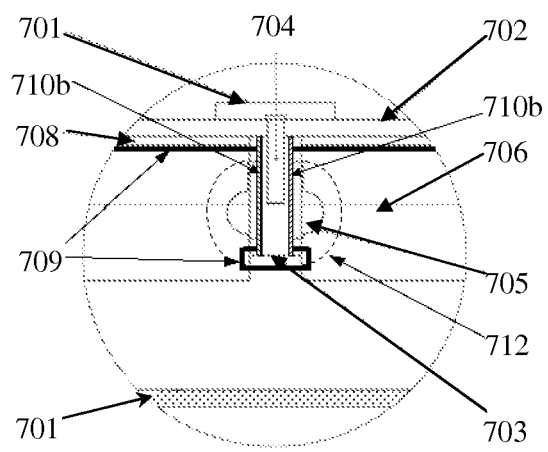
FIG. 2(e) is a close-up side view of Region A denoted in FIG. 2(c)
Figure 2F:
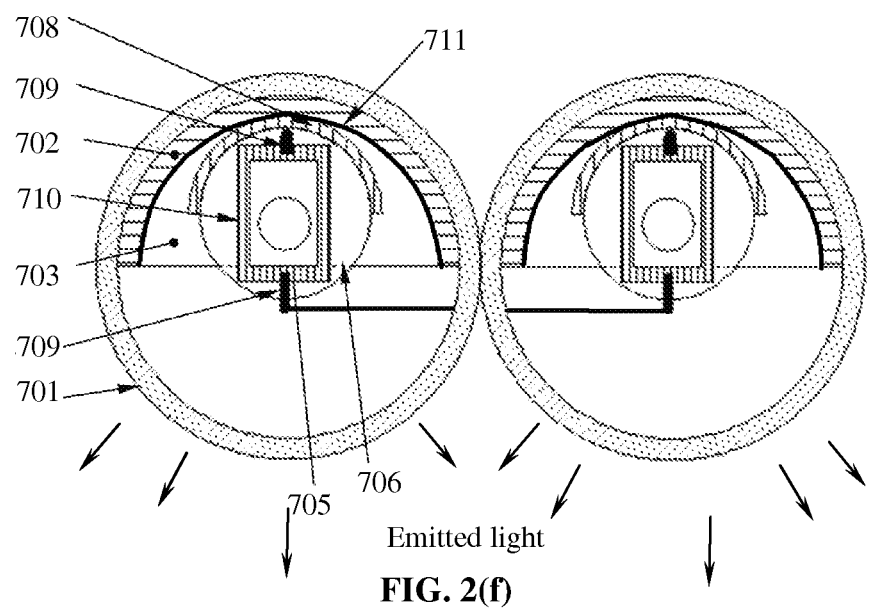
FIG. 2(f) is the cross-sectional view of the light tube at the location B-B denoted in FIG. 2(c)
Figure 2G:
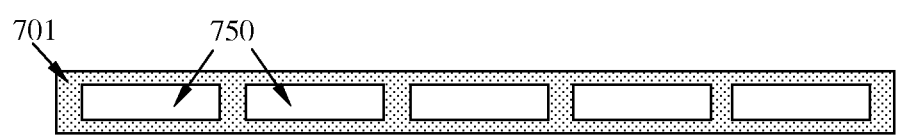
FIG. 2(g) is a schematic side view of the backside of the shell of a light tube.

This is best shown in FIG. 2(f), which illustrates how light from the LEDs is reflected out of the light tube by reflectors 708 and 711. Further, the light guide is mounted in a metal jacket 702 which has a reflector 711 on its inner surface. The light from the LED 705 is reflected outwards of the opposite side of the light tube by reflectors 708 and 711 as shown by the arrows in FIG. 2(f). The reflector 708 may be a reflective coating, such as a spray on coating, on the exterior surface of the light guide facing the metal jacket. The coverage area of the reflective coating 708 may be adjusted in order to achieve different light emitting profiles. The surface of the light guides 706 may be roughened to adjust the optical distribution. The reflector 711 may be a coating on the inner surface of the metal jacket 702.

The light guides 706 and reflectors 708, 711 improve the optical performance of the light tube. The design may provide a uniform light distribution and eliminate the "spotty effect" which is a major drawback of traditional LED light tubes of the type shown in FIG. 1.

FIG. 2 (b) shows a desk lamp 800 in which the light tube 700 is used. The light tube faces a reflecting portion 810 of the lamp whereby light is reflected outward.

FIG. 2 (c) shows the structure of the light tube 700 in more detail. There are first 701a and second 701b casings made of transparent or translucent material such as plastic or glass. Each casing contains a row of light guides 706 extending end to end along its longitudinal length. Each casing further contains a respective metal jacket 702, of semi-circular or crescent cross section, which supports the light guides.

A plurality of heat spreaders 703 are mounted to the metal jacket 702. The light guides 706 are positioned between the heat spreaders 703, so that each end of a light guide is adjacent a heat spreader. Thus in FIG. 2(c) there is a first light guide 706a between first and second heat spreaders 703a, 703b and a second light guide 706b between the second 703b and third 703c heat spreaders. The heat spreaders 703 are in thermal communication with the metal jacket 702. The heat spreaders 703 have two opposite sides and an LED 705 mounted on one or both sides.

As shown in FIG. 2(c) and FIG. 2(d), surface-mount type LEDs 705 are mounted via substrates 710 to the heat spreaders 703. The heat spreaders 703 are mounted to the metal jacket 702 by one or more screws 704. The heat spreaders 703 serve to the support the LEDs and conduct heat from the LEDs to the metal jacket 702.

The metal jacket 702 plays an important role in the design. It serves not only as a mechanical support for the light guide tubes and LEDs, but also for dispersing the heat generated by LEDs quickly. The LEDs are mounted to the metal jacket via a heat spreader which has a higher thermal conductivity than the metal jacket. For example, the heat spreader may be made of copper and the metal jacket of aluminum. This facilitates rapid conduction of the heat from the LED through the heat spreader to the metal jacket, from where it is dissipated into the surrounding atmosphere. This is especially a great advantage when high power LEDs are applied, which is an obvious trend in the LED illumination industry. The metal jacket is contained in the transparent or translucent shell casing 701. As shown in FIG. 2(f), openings 750 may be provided in the shell casing 701, at the side to which the metal jacket 702 is attached, in order to improve heat dissipation.

The LEDs are mounted to a heat spreader and accommodated in a recess or cavity 712 in the end of the light guide 706, as shown in FIG. 2 (d) and FIG. 2 (e). Each light guide 706 preferably has a lathed cavity 712 at each end for accommodating an LED. Electrical connectors, such as wires 709, are used to connect the LEDs 705 in series and to the end cap 707. The wires extend from the end cap to the nearest LED and then along the light guide to the LED on the opposite side of the light guide. Wires also connect LEDs in adjacent light guides and may pass through a hole in the heat spreader 703, as shown in FIG. 2 (d).

The design of the light tube is flexible. The light guides 706 form divisions or segments which can be combined in different ways to form the LED light tube. Generally the light guides will be of the same length, so that the divisions are periodic. The light guides can be combined in double-lines to form a twin tube structure, as shown in FIG. 2(a) and FIG. 3 (a). In this case there are two casings 701 which may be fixed together.

Alternatively the light guides 706 could be lined up in a single line to form a single line tube similar to a traditional fluorescent light tube. The light guides 706 are not limited to a cylindrical shape, but may have a variety of cross-sectional shapes. For example, in FIG. 3(a) the cross sectional shape is circular, while in FIG. 3(b) it is rectangular and in FIG. 3 (c) it is diamond shaped.

The number of LEDs may be varied as well. FIG. 3(d) shows a crescent shaped light guide having two LEDs accommodated at each end (total of four LEDs). In FIG. 3 (d) the light guide is accommodated in a single large casing 701.

Figure 3A:
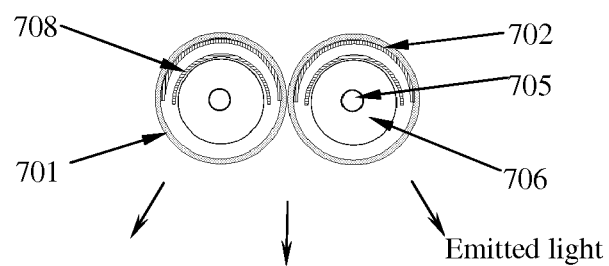
FIG. 3(a) is a schematic view of the cross-section of the light tube, according to the first embodiment of the present invention.
Figure 3B:
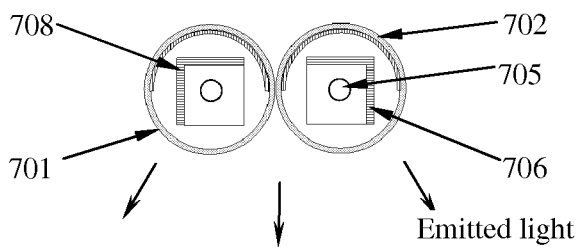
FIG. 3(b) is a schematic view of the cross-section of the light tube, according to a second embodiment of the present invention.
Figure 3C:
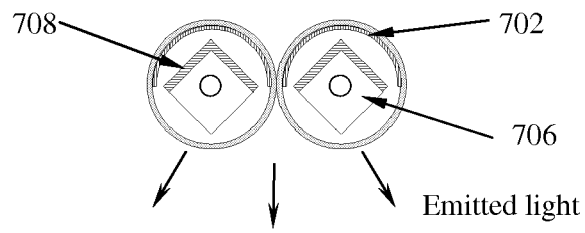
FIG. 3(c) is a schematic view of the cross-section of the light tube, according to the third embodiment of the present invention.
Figure 3D:
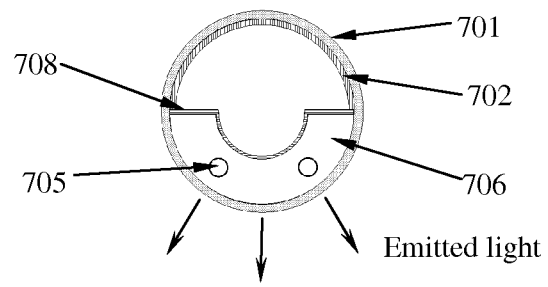
FIG. 3(d) is a schematic view of the cross-section of the light tube, according to the fourth embodiment of the present invention.
Figure 3E:
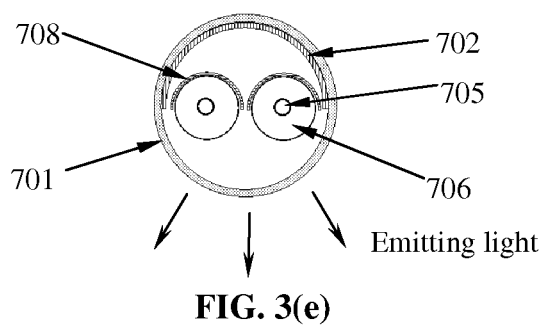
FIG. 3(e) is a schematic view of the cross-section of the LED light tube, according to the fifth embodiment of the present invention.
Figure 3F:
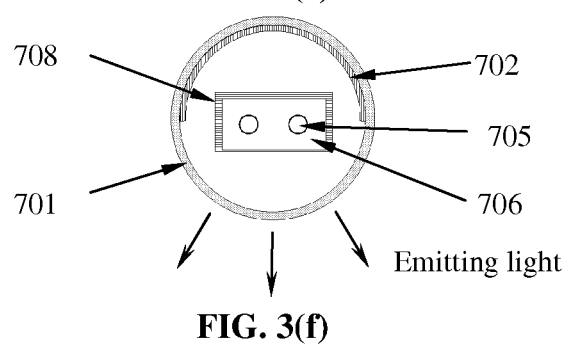
FIG. 3(f) is a schematic view of the cross-section of the LED light tube, according to the sixth embodiment of the present invention.
Figure 3G:
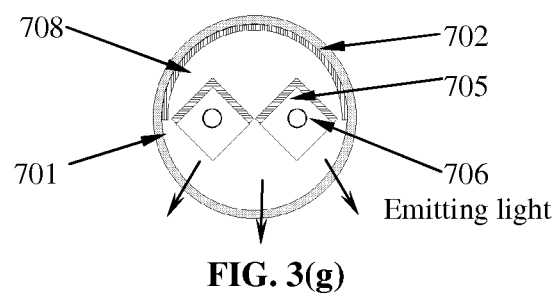
FIG. 3(g) is a schematic view of the cross-section of the LED light tube, according to the seventh embodiment of the present invention.

While in FIGS. 3(a) to 3(b) the light guides are housed in two parallel casings 701a and 701b, they may alternatively be housed as parallel multiple rows in one larger casing 701 as shown in FIG. 3(e), FIG. 3(f), and FIG. 3(g). The light-distribution can be adjusted by applying light guides of different shapes. This brings a great ease and flexibility to the design of the light tube.

Preferred embodiments of the present invention have been described above with reference to the drawings. However, a person skilled in the art may be able to make variations and modifications to the above described examples, while still remaining within the scope of protection which is defined by the claims.

What is claimed:

1. A light tube, comprising:
   a plurality of disparate segments arranged end to end longitudinally along the light tube, wherein each of the plurality of disparate segments comprises a transparent or translucent rod having two ends and light-emitting diodes (LEDs) mounted to heat spreaders for direction of light longitudinally into the transparent or translucent rod at each of the two ends, wherein the transparent or translucent rod abuts at least one of the heat spreaders at at least one of the two ends, and wherein each of the two ends, including terminal ends of the light tube, comprises a recessed surface that accepts at least one of the LEDs; and at least one reflector for reflection of light out of the light tube.

2. The light tube of claim 1, wherein the at least one reflector includes a reflective coating on at least one of the plurality of disparate segments.

3. The light tube of claim 1, wherein the heat spreaders are mounted to at least one metal member comprising a metal jacket for dissipation of heat, and wherein respective heat spreaders including each heat spreader in different ones of the plurality of disparate segments are mounted to the metal jacket.

4. A light tube, comprising:
a plurality of light guides having recessed ends and a plurality of point light sources, wherein each of the plurality of point light sources is associated with a light guide of the plurality of light guides and arranged to direct light into the light guide at one of the recessed ends, wherein the plurality of point light sources is in thermal communication with a metal member to dissipate heat, wherein the plurality of point light sources are accepted into the recessed ends of the plurality of light guides including light guides located at terminal ends of the light tube, wherein each of the plurality of point light sources is mounted to a respective heat spreader attached to the metal member, and wherein the respective heat spreader abuts one of the recessed ends of the light guide.

5. The light tube of claim 4, wherein at least one of the plurality of point light sources is a light-emitting diode (LED).

6. The light tube of claim 5, wherein the recessed ends conform to a shape of the LED and are symmetrical about a longitudinal axis that extends along the plurality of light guides.

7. The light tube of claim 4, wherein the respective heat spreader has a higher thermal conductivity than the metal member.

8. The light tube of claim 4, wherein the light guide has a reflector to reflect light out of the light tube respective heat spreader spans the one of the recessed ends.

9. The light tube of claim 4, wherein the light guide comprises a reflective coating of the light guide to reflect light out of the light tube.

10. The light tube of claim 4, wherein the light guide comprises at least one of a translucent rod or a transparent rod.

11. The light tube of claim 4, wherein the light tube comprises the plurality of light guides in two or more parallel rows.

12. The light tube of claim 4, wherein the plurality of point light sources and the plurality of light guides are arranged periodically along a length of the light tube.

13. A light tube, comprising:
at least first and second light guides arranged end to end along a length of a tube, wherein the first and second light guides have respective first recessed ends and respective second recessed ends, including terminal ends of the tube, wherein the respective second recessed end of the first light guide faces the respective first recessed end of the second light guide, and wherein respective first recessed ends and respective second recessed ends are symmetrical in shape about a longitudinal axis that extends along the length of the tube;
a first point light source accepted at the respective first recessed end of the first light guide;
a second point light source accepted between the respective second recessed end of the first light guide and the respective first recessed end of the second light guide; and
a third point light source accepted at the respective second recessed end of the second light guide, wherein each of the first point light source, the second point light source, and the third point light source is mounted to heat spreaders, and wherein the heat spreaders abut respective first recessed ends and respective second recessed ends.

14. The light tube of claim 13, further comprising:
three or more light guides arranged end to end having respective recessed ends and respective point light sources on respective heat spreaders that span each of the respective recessed ends of the three or more light guides.

15. The light tube of claim 13, wherein the respective first recessed ends and the respective second recessed ends conform to respective light-emitting diodes (LEDs).

16. The light tube of claim 13, wherein at least one of the first, second, or third point light sources comprises a light-emitting diode (LED).

17. The light tube of claim 13, wherein at least one light guide of the at least the first and the second light guides has a reflector for reflection of light out of the light tube, wherein the reflector comprises at least one reflective coating on the at least one light guide.

18. A lighting method, comprising:
directing light from a plurality of point light sources longitudinally into recessed ends of at least one of a plurality of separate light guides to create transmitted light, wherein the directing light comprises directing light from at least two of the plurality point light sources, respectively, into each of the recessed ends of the at least one of the plurality of separate light guides, wherein the at least one of the plurality of separate light guides comprises a light guide located at a terminal end of a longitudinal arrangement of the plurality of separate light guides, wherein the recessed ends are configured to accept at least one of the plurality of point light sources;
reflecting at least a part of the transmitted light at least radially from the at least one of the plurality of separate light guides; and
conducting heat from the at least two of the plurality of point light sources via respective heat spreaders that abut the recessed ends of the at least one of the plurality of separate light guides.

19. The method of claim 18, wherein the directing light from the plurality of point light sources includes directing light from at least one light-emitting diode (LED).

20. The method of claim 18, wherein the directing light longitudinally into the recessed ends includes directing light longitudinally into recessed ends of at least one rod comprising at least one of a translucent or transparent material.

21. The method of claim 18, wherein the conducting the heat from the at least two of the plurality of point light sources includes transferring the heat to a metal member proximate to the respective heat spreaders.

22. The method of claim 18, wherein the reflecting the at least the part of the transmitted light includes reflecting the at least the part of the transmitted light from a reflective coating on the at least one of the plurality of separate light guides.

* * * * *